(12) United States Patent
Ko

(10) Patent No.: US 8,302,994 B2
(45) Date of Patent: Nov. 6, 2012

(54) SHIELD COVER ASSEMBLY FOR VEHICLE INTERLOCKING WITH SEAT HEIGHT ADJUSTMENT DEVICE

(75) Inventor: Hyun Ko, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 116 days.

(21) Appl. No.: 12/901,115

(22) Filed: Oct. 8, 2010

(65) Prior Publication Data

US 2011/0215604 A1 Sep. 8, 2011

(30) Foreign Application Priority Data

Mar. 8, 2010 (KR) ........................ 10-2010-0020387

(51) Int. Cl.
*B60R 22/20* (2006.01)
(52) U.S. Cl. ...................... 280/801.1; 280/806; 297/482
(58) Field of Classification Search ............... 280/801.1, 280/801.2, 806; 296/1.08; 297/338, 344.12, 297/452.38, 468, 481, 482; *B60R 22/03, B60R 22/19, 22/195, 22/20, 22/26*
See application file for complete search history.

(56) References Cited

U.S. PATENT DOCUMENTS

| | | | | |
|---|---|---|---|---|
| 3,437,349 A * | 4/1969 | Feles et al. | ...................... | 297/482 |
| 4,790,597 A * | 12/1988 | Bauer et al. | ...................... | 297/468 |
| 5,064,220 A * | 11/1991 | Ogawa | ........................ | 280/801.1 |
| 5,104,193 A * | 4/1992 | Fohl | .............................. | 297/482 |
| 5,149,135 A * | 9/1992 | Konishi et al. | ................. | 280/806 |
| 5,158,339 A * | 10/1992 | Miyanaga | ..................... | 297/482 |
| 5,288,133 A * | 2/1994 | Mizushima et al. | ...... | 297/452.38 |
| 5,290,062 A * | 3/1994 | Fohl | ............................ | 280/801.2 |
| 5,318,350 A * | 6/1994 | Okamoto | ....................... | 297/468 |
| 5,431,446 A * | 7/1995 | Czarnecki et al. | ............ | 280/802 |
| 5,707,080 A * | 1/1998 | Isaji et al. | ...................... | 280/806 |
| 6,089,605 A * | 7/2000 | Muller | ............................ | 280/806 |
| 6,095,615 A * | 8/2000 | Wier | .............................. | 297/480 |
| 6,155,727 A * | 12/2000 | Wier | .............................. | 297/480 |
| 6,250,720 B1 * | 6/2001 | Wier | .............................. | 297/468 |
| 6,467,849 B1 * | 10/2002 | Deptolla | ....................... | 297/464 |
| 6,808,207 B2 * | 10/2004 | Nakano et al. | ................ | 280/806 |
| 6,863,308 B2 * | 3/2005 | Motozawa | ..................... | 280/806 |
| 6,866,296 B2 * | 3/2005 | Webber et al. | ................ | 280/806 |
| 6,902,195 B2 * | 6/2005 | Ball et al. | ....................... | 280/806 |
| 7,475,909 B2 | 1/2009 | Takao et al. | | |
| 7,510,245 B2 * | 3/2009 | Okazaki et al. | ................ | 297/483 |
| 7,635,167 B2 * | 12/2009 | Okazaki | ......................... | 297/483 |
| 7,648,208 B2 * | 1/2010 | Weinstein et al. | ............ | 297/481 |
| 7,900,965 B2 * | 3/2011 | Hata et al. | ...................... | 280/806 |
| 2006/0231317 A1 * | 10/2006 | Yamaguchi et al. | .......... | 180/268 |

FOREIGN PATENT DOCUMENTS

FR 2616726 A1 * 12/1988

(Continued)

*Primary Examiner* — Ruth Ilan
*Assistant Examiner* — Laura Freedman
(74) *Attorney, Agent, or Firm* — Morgan, Lewis & Bockius LLP

(57) ABSTRACT

A shield cover assembly for a vehicle, may include a shield cover main body, on which a slot is formed thereon in one direction and another direction of the vehicle, and a sliding cover disposed on a bottom surface of the shield cover main body such that the slot is not exposed outside the shield cover main body, wherein the sliding cover has a penetration portion formed in a hollow shape thereon and an anchorage pretensioner member is fixed to a cushion frame through the penetration portion, and wherein the sliding cover is slidable along the bottom surface in the one direction and the another direction in accordance with a movement of the shield cover main body.

14 Claims, 7 Drawing Sheets

<BEFORE A SEAT ASCENDS>

FOREIGN PATENT DOCUMENTS

| | | | |
|---|---|---|---|
| JP | 03262760 A * | 11/1991 | |
| JP | 06135298 A * | 5/1994 | |
| JP | 6-156190 A | 6/1994 | |
| JP | 7-329711 A | 12/1995 | |
| JP | 9-30369 A | 2/1997 | |
| JP | 2001-213273 A | 8/2001 | |
| JP | 2003-205822 A | 7/2003 | |
| JP | 2006-88943 A | 4/2006 | |
| JP | 2010064639 A * | 3/2010 | |
| JP | 2010-70158 A | 4/2010 | |
| JP | 2010179681 A * | 8/2010 | |
| KR | 20-0147919 Y1 | 3/1999 | |

* cited by examiner

<Related Art>

SHIELD COVER ASSEMBLY FOR VEHICLE INTERLOCKING WITH SEAT HEIGHT ADJUSTMENT DEVICE

CROSS-REFERENCE TO RELATED APPLICATION

The present application claims priority to Korean Patent Application No. 10-2010-0020387, filed on Mar. 8, 2010 in the Korean Intellectual Property Office, the entire contents of which is incorporated herein for all purposes by this reference.

BACKGROUND OF THE INVENTION

1. Field of the Invention

The present invention relates to a shield cover assembly for a vehicle, and more particularly, to a shield cover assembly for a vehicle interlocking with a seat height adjustment device.

2. Description of Prior Art

In general, a seat belt of a vehicle is a device that restricts the forward movement of a passenger to seek a passenger's safety, and is composed of webbing, a buckle, and the like.

Recently, an anchorage pretensioner member, which reduces the injury of the abdominal region or knees of a passenger by restricting the waist of the passenger through pulling of the webbing when vehicle collision occurs, has been mounted in a vehicle.

FIG. 1 is a perspective view illustrating a portion of a seat of a vehicle in the related art.

The height of a seat 150 in FIG. 1 can be adjusted by a seat height adjustment device (not illustrated), and an anchorage pretensioner member 103 is fixedly installed on a cushion frame (not illustrated) of the seat 150 to pull a webbing 102 when vehicle collision occurs.

One end of the anchorage pretensioner member 103 is connected to the webbing 102, and the other end thereof is fixed to the cushion frame. In this case, one side surface of the seat 150, a shield cover 101 for hiding a portion of the anchorage pretensioner member 103 is fixedly installed on the cushion frame.

The shield cover 101 moves in upward, downward, front, and rear directions relative to the anchorage pretensioner member 103 when the height of the seat 150 is adjusted by the seat height adjustment device.

Accordingly, in order to avoid interference between the shield cover 101 and the anchorage pretensioner member 103, a portion of the shield cover 101 that corresponds to the trace of interference has been removed, and a rubber 110 has been inserted into the removed portion to prevent the removed portion from being exposed. In this case, a slot 115 that corresponds to the trace of the anchorage pretensioner member 103 is formed on the rubber 110.

However, in the related art, the shape of the slot 115 formed on the rubber 110 is non-uniform to cause the quality to deteriorate, and alien substances may flow in through the slot 115.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a shield cover assembly for a vehicle, which can improve the quality and prevent inflow of alien substances.

In an aspect of the present invention, the shield cover assembly for a vehicle, may include a shield cover main body, on which a slot is formed thereon in one direction and another direction of the vehicle, and a sliding cover disposed on a bottom surface of the shield cover main body such that the slot is not exposed outside the shield cover main body, wherein the sliding cover has a penetration portion formed in a hollow shape thereon and an anchorage pretensioner member is fixed to a cushion frame through the penetration portion, and wherein the sliding cover is slidable along the bottom surface in the one direction and the another direction in accordance with a movement of the shield cover main body.

When the shield cover main body is moved in an upward direction by a seat height adjustment device, the sliding cover may be forced by the anchorage pretensioner member to slide in the one direction, and when the shield cover main body is moved downward, the sliding cover may be forced by the anchorage pretensioner member to slide in the another direction.

A support groove may be formed along the bottom surface of the shield cover main body and the sliding cover is slidably coupled thereto to guide the sliding cover, wherein at least one distal end of the sliding cover includes a stopper disposed outside the sliding guide through the sliding groove to limit a displacement range of the sliding cover.

A sliding guide may be fixed under the bottom surface of the shield cover main body to form a sliding groove between the bottom surface and the sliding guide for slidably guiding the sliding cover through the sliding groove, wherein at least one distal end of the sliding cover includes a stopper disposed outside the sliding guide through the sliding groove to limit a displacement range of the sliding cover.

The penetration portion may have force transfer portions formed on an inner circumference thereof to be bent downwardly with a predetermined angle against the sliding cover, and the height of the force transfer surface is larger than a pitch of bellows of the anchorage pretensioner member, wherein the predetermined angle is an acute angle, and wherein the predetermined angle is between approximately 30° and approximately 90°.

The sliding cover may be formed to have a length that is longer than the largest length of the slot.

With the construction as described above, the shield cover assembly for a vehicle according to the present invention can improve the quality and prevent inflow of alien substances.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
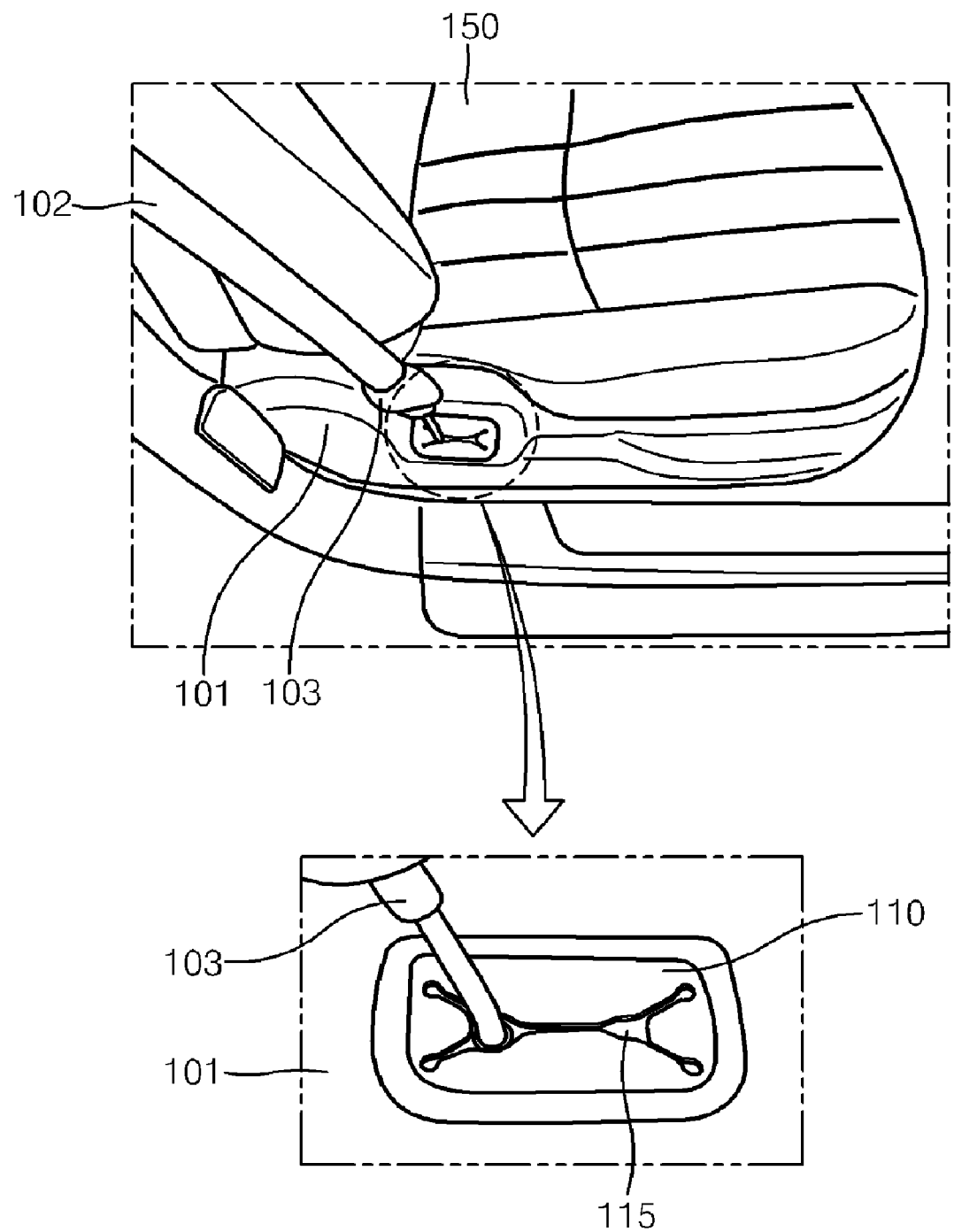
FIG. 1 is a perspective view illustrating a portion of a seat of a vehicle in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
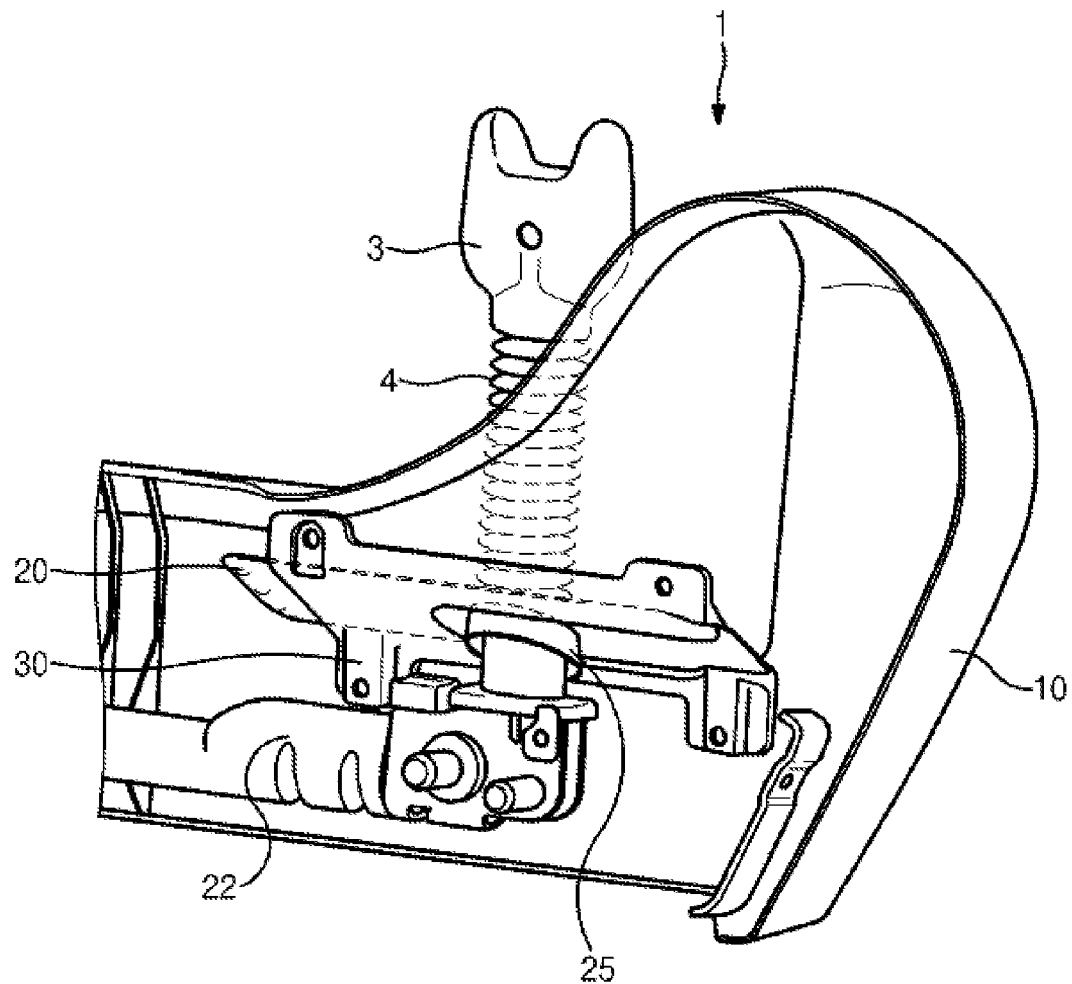
FIG. 2 is a perspective view illustrating a bottom of a shield cover assembly according to an embodiment of the present invention.
Figure 3:
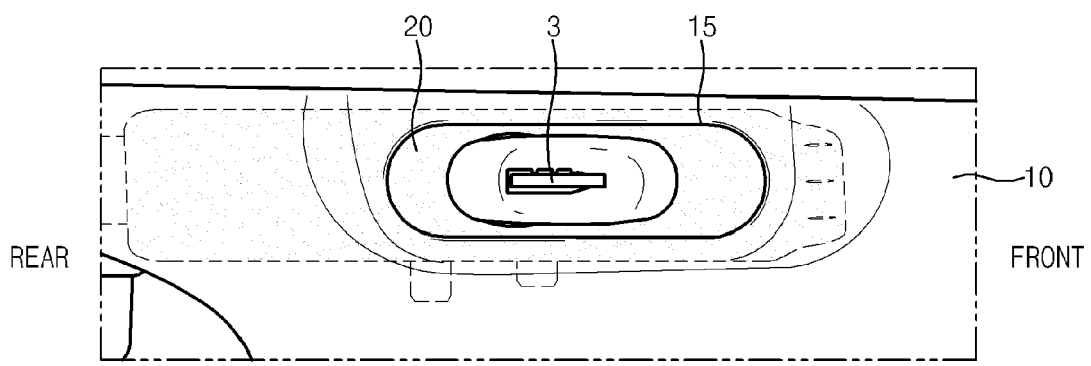
FIG. 3 is a plan view of FIG. 2.

FIG. 2 is a perspective view illustrating a bottom of a shield cover assembly according to an exemplary embodiment of the present invention, and FIG. 3 is a plan view of FIG. 2.

A shield cover assembly 1 according to an embodiment of the present invention operates interlocking with a seat height adjustment device 5 (see FIG. 4), and briefly includes a shield cover main body 10 fixed to a side surface of a seat, and a sliding cover 20 installed on the bottom surface of the shield cover main body 10 to be slidable in forward and backward directions.

The shield cover main body 10 moves together with the seat when the height of the seat is adjusted by the seat height adjustment device 5, and a long slot 15 is formed on the plate surface in forward and backward directions.

The slot 15 is formed to prevent the anchorage pretensioner member 3 from interfering with the shield cover main body 10 when the height of the seat is adjusted by the seat height adjustment device 5.

Here, the anchorage pretensioner member 3 reduces the injury level of the abdominal region or knees of a passenger by restricting the waist of the passenger through pulling of a webbing 102 when vehicle collision occurs. One end of the anchorage pretensioner member 3 is connected to the webbing 102, and the other end thereof is fixed to a cushion frame 22.

The sliding cover 20 is slidably installed on a bottom surface of the shield cover main body 10 to prevent the slot 15 from being exposed to the outside. A penetration portion 25 is formed on the plate surface, through which the anchorage pretensioner member 3 passes.

Here, the sliding cover 20 is formed to have a length that is longer than that of the slot 15 so as to prevent the exposure of the slot 15 when the sliding cover 20 slides along the shield cover main body 10.

Figure 5:
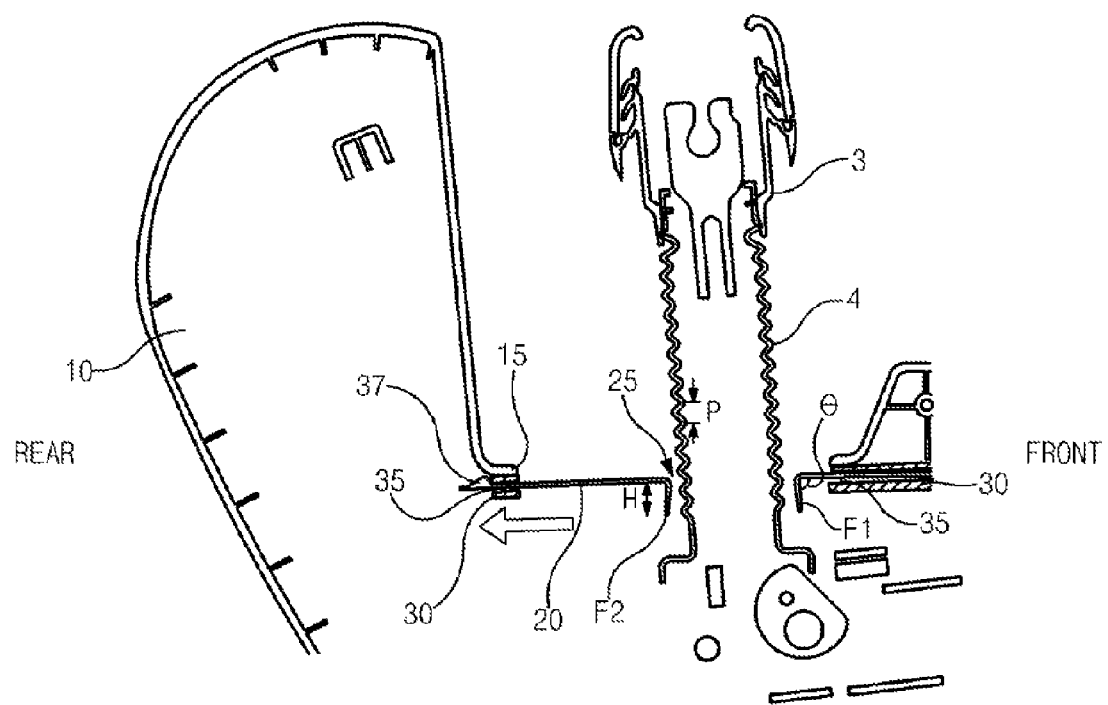
FIG. 5 is a sectional view of the state in FIG. 4.

The penetration unit 25, as minutely illustrated in FIG. 5, has force transfer portions F1 and F2 formed thereon to be bent downwardly at a predetermined angle θ against the plate surface of the sliding cover 20. In this case, the angle θ between the sliding cover 20 and the force transfer portions F1 and F2 may be in the range of 30° to 90°. Also, the height H of the force transfer portions F1 and F2 is larger than a pitch P of bellows 4 of the anchorage pretensioner member 3, so that when the height of the seat is adjusted upward and downward, the anchorage pretensioner member 3 well transfers force to the force transfer portions F1 and F2, and thus the sliding cover 20 slides smoothly.

A stopper 37 may be formed at one distal end of the sliding cover to limit a movement of the sliding cover 20 within a predetermined displacement.

On the bottom surface of the shield cover main body 10, a sliding guide 30 is fixed. At the front end and the rear end of the sliding guide 30, a support groove 35 for supporting the front end and the rear end of the sliding cover 20 is formed, and the sliding cover 20 slides along the support groove 35 to prevent the slot 15 from being exposed. In the present embodiment of the present invention, it is exemplified that the sliding cover 20 is guided by the sliding guide 30. However, it is also possible that the support groove 35 is formed on the shield cover main body 10, and the sliding cover 20 slides along the support groove without a separate sliding guide 30.

With the above-described construction, the operation of the shield cover assembly 1 for a vehicle, interlocking with the seat height adjustment device 5 according to an embodiment of the present invention will be described with reference to FIGS. 4 to 7.

Figure 4:
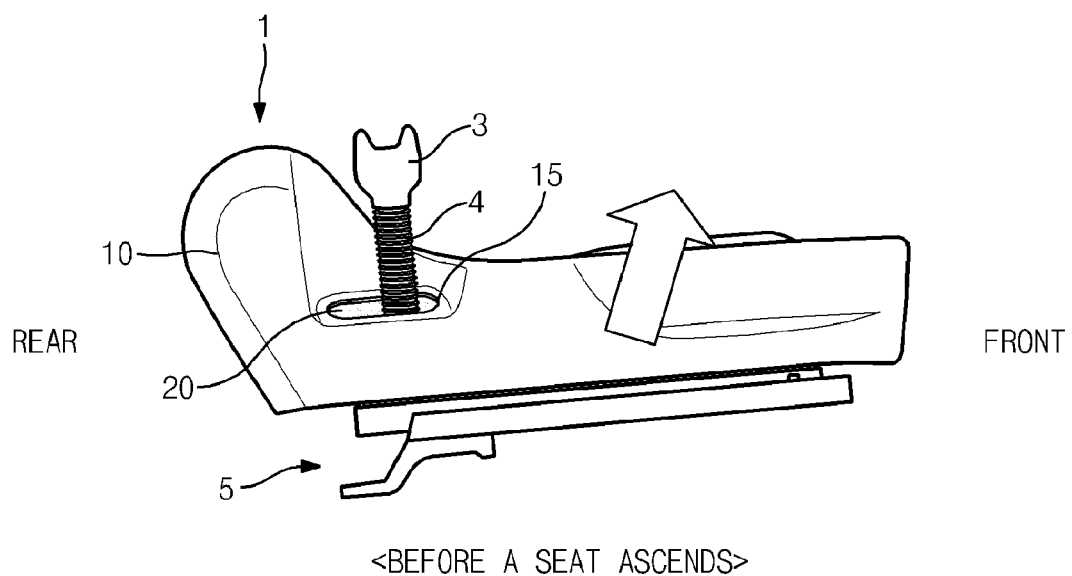
FIG. 4 is a perspective view illustrating the side portion of a shield cover assembly according to the present invention before a seat ascends.

First, the state of the shield cover assembly 1 before the seat ascends is illustrated in FIGS. 4 and 5.

Figure 6:
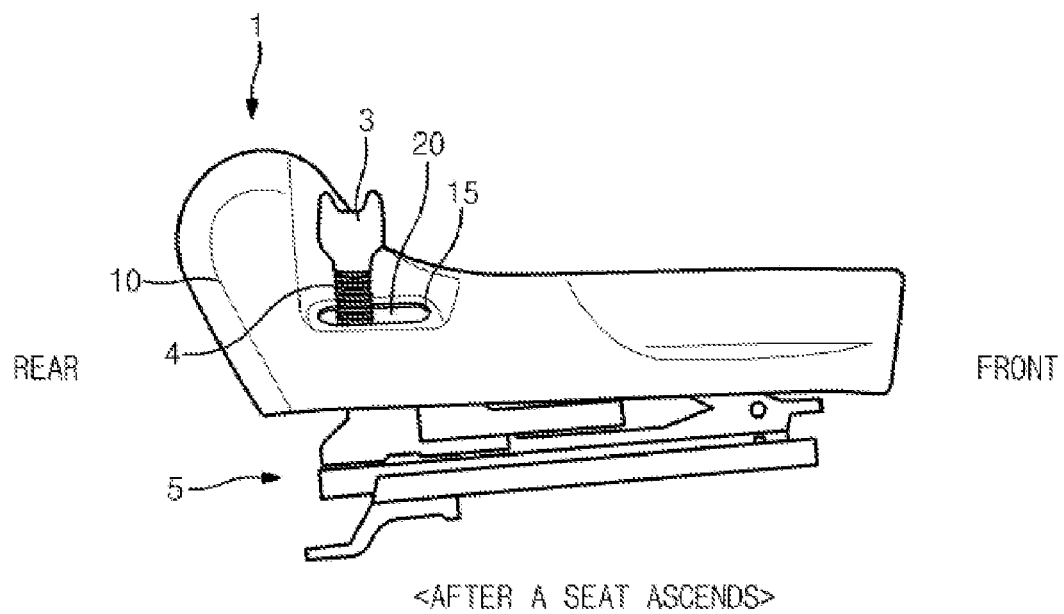
FIG. 6 is a perspective view illustrating the side portion of a shield cover assembly according to the present invention after a seat ascends.
Figure 7:
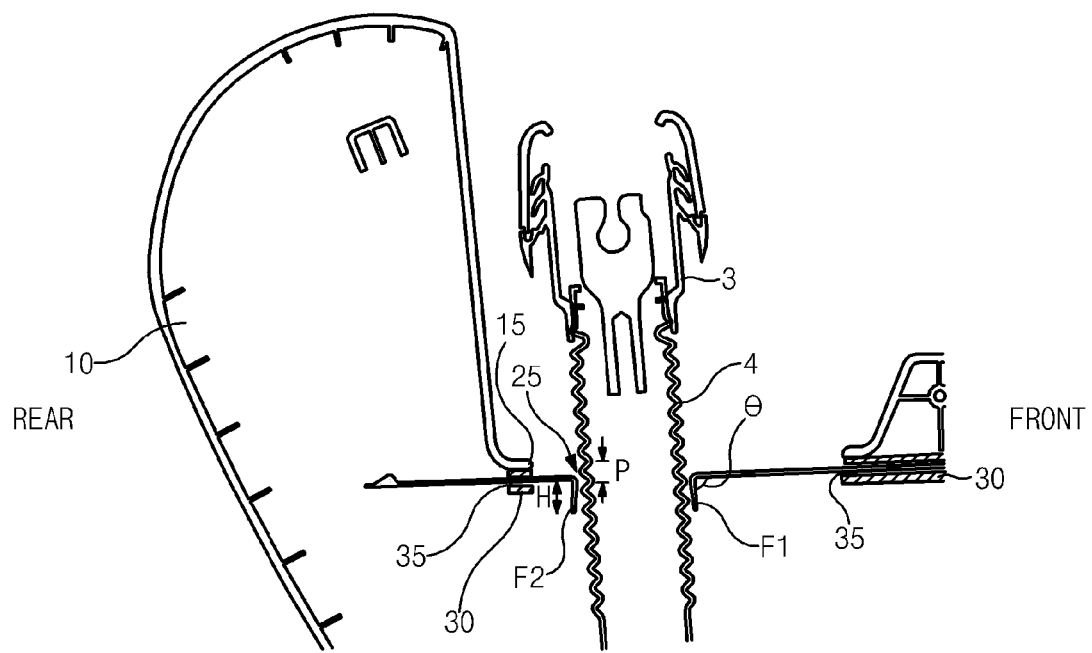
FIG. 7 is a sectional view of the state in FIG. 6.

Thereafter, if the seat ascends by the seat height adjustment device 5 and moves upward together with the shield cover main body 10, the rear force transfer surface F2 positioned on the rear side of the penetration portion 25 is forced by the bellows 4 of the anchorage pretensioner member 3, and as a result, the sliding cover 20 slides backward along the support groove 35 of the sliding guide 30 (see FIGS. 6 and 7).

By contrast, if the seat descends by the seat height adjustment device 5 the shield cover main body 10 moves downward together with the seat, the front force transfer surface F1 positioned on the front side of the penetration portion 25 is forced by the bellows 4 of the anchor pretensioner member, and as a result, the sliding cover 20, as shown in FIGS. 4 and 5, slides forward along the support groove 35.

As described above, since the exposure of the slot 15 is prevented as the sliding cover 20 slides in forward and backward directions when the height of the seat is adjusted, the problems in that the shape of the slot 15 is non-uniform to deteriorate the quality, and alien substances flow in through the slot 14, which occurs in the related art, can be solved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A shield cover assembly for a vehicle, comprising:
    a shield cover main body, on which a slot is formed thereon in one direction and another direction of the vehicle; and
    a sliding cover disposed on a bottom surface of the shield cover main body such that the slot is not exposed outside the shield cover main body when viewed from a bottom-up perspective,
    wherein the sliding cover has a penetration portion formed in a hollow shape thereon and an anchorage pretensioner member is fixed to a cushion frame through the penetration portion, and
    wherein the sliding cover is slidable along the bottom surface in the one direction and the another direction in accordance with a movement of the shield cover main body.

2. The shield cover assembly according to claim 1, wherein:
    when the shield cover main body is moved in an upward direction by a seat height adjustment device, the sliding cover is forced by the anchorage pretensioner member to slide in the one direction, and
    when the shield cover main body is moved downward, the sliding cover is forced by the anchorage pretensioner member to slide in the another direction.

3. The shield cover assembly according to claim 2, wherein the penetration portion has force transfer portions formed on an inner circumference thereof to be bent downwardly with a predetermined angle against the sliding cover, and the height of a force transfer surface is larger than a pitch of bellows of the anchorage pretensioner member.

4. The shield cover assembly according to claim 3, wherein the predetermined angle is an acute angle.

5. The shield cover assembly according to claim 4, wherein the predetermined angle is between approximately 30° and less than 90°.

6. The shield cover assembly according to claim 1, wherein a support groove is formed along the bottom surface of the shield cover main body and the sliding cover is slidably coupled thereto to guide the sliding cover.

7. The shield cover assembly according to claim 6, wherein at least one distal end of the sliding cover includes a stopper disposed outside a sliding guide through a sliding groove to limit a displacement range of the sliding cover.

8. The shield cover assembly according to claim 1, wherein a sliding guide is fixed under the bottom surface of the shield cover main body to form a sliding groove between the bottom surface and the sliding guide for slidably guiding the sliding cover through the sliding groove.

9. The shield cover assembly according to claim 8, wherein at least one distal end of the sliding cover includes a stopper disposed outside the sliding guide through the sliding groove to limit a displacement range of the sliding cover.

10. The shield cover assembly according to claim 1, wherein the penetration portion has force transfer portions formed on an inner circumference thereof to be bent downwardly with a predetermined angle against the sliding cover, and the height of a force transfer surface is larger than a pitch of bellows of the anchorage pretensioner member.

11. The shield cover assembly according to claim 10, wherein the predetermined angle is an acute angle.

12. The shield cover assembly according to claim 11, wherein the predetermined angle is between 30° and less than 90°.

13. The shield cover assembly according to claim 1, wherein the sliding cover is formed to have a length that is longer than the largest length of the slot.

14. A method of moving the sliding cover in the shield cover assembly according to claim 1, wherein:
    when the shield cover main body is moved in an upward direction by a seat height adjustment device, the sliding cover is forced by the anchorage pretensioner member to slide in the another direction, and
    when the shield cover main body is moved downward, the sliding cover is forced by the anchorage pretensioner member to slide in the one direction.

* * * * *